United States Patent [19]

Sowar et al.

[11] Patent Number: 5,351,196

[45] Date of Patent: Sep. 27, 1994

[54] METHOD AND APPARATUS FOR SOLIDS BASED MACHINING

[75] Inventors: Richard M. Sowar, Boulder; William C. Heiny, Arvada; Paul C. Olsen, Broomfield; Mark R. Hotchkiss, Louisville; Thomas L. Dixon, Broomfield; Charles W. Richard, Jr.; Michael D. Raines, both of Boulder, all of Colo.

[73] Assignee: Spacial Technology, Inc., Boulder, Colo.

[21] Appl. No.: 138,816

[22] Filed: Oct. 14, 1993

Related U.S. Application Data

[63] Continuation of Ser. No. 669,943, Mar. 15, 1991, abandoned.

[51] Int. Cl.$^5$ .................. G06F 15/46; G06F 15/60
[52] U.S. Cl. .................. 364/474.24; 364/474.32; 364/474.33; 364/468; 395/120
[58] Field of Search ............ 364/468, 474.24, 474.22, 364/474.32, 474.33, 474.34; 395/120, 919; 318/570, 571

[56] References Cited

U.S. PATENT DOCUMENTS

| | | | |
|---|---|---|---|
| 4,382,215 | 5/1983 | Barlow et al. | 318/572 |
| 4,564,913 | 1/1986 | Yomogida et al. | 364/468 |
| 4,618,924 | 10/1986 | Hinds | 364/191 |
| 4,791,583 | 12/1988 | Colburn | 364/522 |
| 4,833,617 | 5/1989 | Wang | 364/474.15 |
| 4,837,703 | 6/1989 | Kakazu et al. | 364/474.18 |
| 4,907,164 | 3/1990 | Guyder | 364/474.15 |
| 4,945,487 | 7/1990 | Kimura et al. | 364/474.02 |
| 4,989,152 | 1/1991 | Cheng | 364/474.24 |
| 5,023,800 | 6/1991 | Carver et al. | 364/474.24 |
| 5,089,950 | 2/1992 | Miyata et al. | 364/191 |
| 5,189,626 | 2/1993 | Colburn | 364/474.24 |
| 5,249,135 | 9/1993 | Funita | 364/474.21 |

FOREIGN PATENT DOCUMENTS

| | | |
|---|---|---|
| 3833715 | 5/1989 | Fed. Rep. of Germany . |
| WO90/15376 | 12/1990 | PCT Int'l Appl. . |
| 2188846 | 10/1987 | United Kingdom . |
| 2192075 | 12/1987 | United Kingdom . |

OTHER PUBLICATIONS

Dyke, *Numerical Control* (Prentice–Hall, Inc.) 1968, ch. 11–12.
Erisman and Neves, "Advanced Computing for Manufacturing," *Scientific American* Oct. 1982.
Mills, "Engineering Software–Manufacturing," *Computer–Aided Engineering,* Dec. 1988, pp. 34–38.
Mills, "Engineering Software–Mechanical Design," *Computer–Aided Engineering,* Dec. 1988, pp. 22–32.
Mills, "NC Keeps Pace," *Computer–Aided Engineering,* Feb. 1989, pp. 28–39.
Holmes, *Solid Modeling Brief,* ed. 3.0 (General Dynamics, Data Systems Division) Apr. 1988.

*Primary Examiner*—Paul Gordon
*Attorney, Agent, or Firm*—Jenner & Block

[57] ABSTRACT

The present invention relates to processes for the automatic generation of numerical control (NC) tool paths in a CAD/CAM environment. The present invention operates on mechanical parts described as solid models. The process employs well-defined solid models of the part to be machined and the raw stock from which it will be machined. The volumetric difference between the stock and the part defines the material (delta volumes) that must be cut away during the actual machining process. Delta volumes are solid models, and users (or an expert system) can subdivide delta volumes into smaller volumes that are consistent with a manufacturing process plan. A delta volume and a user-defined strategy for machining the delta volume are then input to NC algorithms. The algorithms generate NC tool paths that remove as much delta volume material as possible. Tool volumes are automatically generated from NC tool paths to represent the volume traversed by the cutting tool. By subtracting the tool volume from the delta volume, the material that remains to be machined modeled and stored as new delta volumes. The subtraction of the tool volume from the stock defines a new stock model that represents the incremental change in stock when the NC tool path is processed at the machine tool. The process is repeated until all delta volumes have been machined and the part has been manufactured.

64 Claims, 11 Drawing Sheets

Fig. 10

EXAMPLE FILE DESCRIBING A MACHINING METHOD

| | | |
|---:|:---:|:---|
| UNITS | := | "INCHES" |
| AREA_CLEAR_CUT_ANGLE | := | 45 |
| AREA_CLEAR_TOOLING_PATTERN | := | AREA_CLEAR_INSIDE_OUT |
| AUTO_SLICE | := | ON |
| CLEAR_DISTANCE | := | 2.5 |
| CLEAR_DISTANCE_TYPE | := | DELTA |
| CLOSEST_AREA_MODE | := | ON |
| COOL_DELIVERY | := | NO_COOL |
| CUT_TYPE | := | CLIMB |
| CUTCOM | := | OFF |
| DEPTH_OF_CUT | := | TOOL_DIAMETER |
| ENTRY | := | Z_AXIS |
| ENTRY_ANGLE | := | 45 |
| ENTRY_DISTANCE | := | DEPTH_OF CUT + .020 |
| ENTRY_DISTANCE_TYPE | := | DELTA |
| ENTRY_FEEDRATE | := | 20 |
| ENTRY_RADIUS | := | TOOL_DIAMETER / 2 |
| EXIT | := | Z_AXIS |
| EXIT_ANGLE | := | 45 |
| EXIT_DISTANCE | := | DEPTH_OF_CUT + .02 |
| EXIT_DISTANCE_TYPE | := | DELTA |
| EXIT_FEEDRATE | := | 20 |
| EXIT_RADIUS | := | TOOL_DIAMETER |
| FAST_FEEDRATE | := | 20 |
| FINISH_FEEDRATE | := | 10 |
| FREE_EDGE_CONDITION_DISTANCE | := | TOOL_DIAMETER / 2 |
| GLOBAL_THICKNESS | := | 0 |
| MANUAL_ENTRY | := | OFF |
| MANUAL_EXIT | := | OFF |
| MAX_DRIVE_LENGTH_FACTOR | := | 3 |
| MAX_FACE_ANGLE | := | 10 |
| RETRACT_DISTANCE | := | 3.5 |
| RETRACT_DISTANCE_TYPE | := | DELTA |
| SLOW_FEEDRATE | := | 10 |
| SPINDLE-SPEED | := | 4000 |
| STEPOVER_DISTANCE | := | TOOL_DIAMETER / 2 |
| TO_DEPTH_FEEDRATE | := | 50 |

METHOD AND APPARATUS FOR SOLIDS BASED MACHINING

This application is a continuation of application Ser. No. 07/669,943, filed Mar. 15, 1991, now abandoned.

BACKGROUND

1. Field of the Invention.

The present invention relates to software processes for the automatic generation of numerical control (NC) tool paths in a CAD/CAM or manufacturing environment.

2. Background of the Invention

Mechanical CAD/CAM systems have been in existence for almost 20 years and were widely popularized in the late 1970's. Initially, CAD/CAM systems were used for creating detailed designs of mechanical parts and for documenting designs using annotations such as dimensions and notes. CAD/CAM systems gradually expanded to other applications such as analysis (e.g., finite element modeling) and manufacturing (e.g., generation of NC tool paths).

As parts are designed with a CAD/CAM system, the system creates computer models of the parts. To date, wireframe and surface modeling have been the predominant representation schemes for CAD/CAM part models. With wireframe modeling, a part is modeled by describing its edges (e.g., a box is represented by 12 lines), and with surface modeling, a part is surface modeled by describing its surfaces (e.g., a box is represented by 6 planar surfaces). These modeling technologies lack information that describes how edges and surfaces fit together to form the physical part. Information that describes the inside and outside of the modeled part is also missing. Because of those limitations, wireframe and surface modeling technologies are classified as informationally incomplete modeling representations. CAD/CAM applications built on these technologies cannot support full automation.

Once a part has been designed on a CAD/CAM system, NC tool paths can be created to automate machining of the part. NC tool paths are programs that control the operation of the machine tool as the machine tool cuts the part from raw stock A computer-aided design (CAD) system is used to create, document and analyze part models, while a computer-aided manufacturing (CAM) system is used to generate NC tool paths directly from the design model. This approach has only been moderately successful. Although a user (manufacturing engineer) of a CAM application may have a well defined strategy for how to machine a part, today's CAD/CAM systems cannot support automatic NC tool path generation. The reason is that wireframe and surface models do not provide complete part model information necessary for automated manufacturing.

As an example, suppose a user needs to create a tool path to cut a single part surface (e.g., the inside bottom surface of a coffee mug). Creating a surface tool path requires that x,y,z points representing the programming point of the tool while the tool remains tangent to the surface for the entire surface be calculated to a predetermined tolerance. When the resultant surface tool path is processed on the machine tool, the bottom center of the cutting tool is moved to each of the tool path x,y,z points in order. The result is that material in the path of the tool is removed.

Because surfaces are part of today's CAD/CAM modeling technology, there are methods for calculating NC tool paths for the surface of a part. However, knowledge of the surfaces of a part alone is not sufficient. The cutting tool must not gouge other surfaces of the part model (e.g., the side surfaces of the coffee mug). This might happen because a cutting tool has a radius greater than zero. Therefore, when the cutting tool comes within a tool radius of an adjoining surface, extra material can be gouged out of the adjoining surface. The machine tool cannot automatically avoid gouging adjoining surfaces because wireframe and surface models lack a description of the relationships between surfaces. For example, wireframe and surface models do not describe that the bottom surface of the coffee mug adjoins the side surfaces—the part's surfaces are modeled independently.

The traditional approaches for resolving this problem require user interaction. The user must manually supply additional information before a part can be manufactured. This is done by a variety of ad hoc ways today. All are time-intensive and prone to error.

The most common approach to CAM today is to create new surfaces specifically for machining. That is, rather than "teaching" the system that the side surfaces of a coffee mug adjoin the bottom surface, the user creates a new bottom surface that is smaller (by at least the cutting tool radius) than the bottom surface as originally designed. As a result, tool paths created for machining the new bottom surface keep the cutting tool away from any adjoining surfaces.

There are several problems with this approach. The most obvious is that the actual design model is not being used for manufacturing, but rather a manufacturing model is being recreated from the design model. This results in a gap between design and manufacturing because the same model is not being shared by design and manufacturing. A second problem is one of time (productivity) and the potential for human error because new surfaces must be created for every surface to be machined—perhaps hundreds of surfaces for a single part. Finally, the new surfaces are created based on the size of the cutting tool. If a different cutting strategy is desired, an entire new set of surfaces must be generated for the manufacturing model.

Researchers in the 1970's developed a new modeling technology called solid modeling, which became commercially available in the early 1980's to overcome the limitations of wireframe and surface modeling technologies. Solid modeling offers an informationally complete representation of three-dimensional parts. Whereas wireframe and surface models have descriptions of the geometry of a part to be manufactured only, solid models have descriptions of the geometry and the topology of the part. The geometry of the part is similar to the geometry for wireframe and surface modeling, but the topology of the part is a "road map" that describes how the surfaces defined by the model fit together to form the actual part being modeled.

Because a solid model describes parts completely and unambiguously, higher level operations such as union, difference and intersection of part models are possible. For instance, to create a hole in a part, a solid model of a cylinder can be positioned on a solid model of the part and geometrically subtracted—leaving the desired hole. Mathematically, this is a Boolean operation. Boolean operations are used throughout the invention described herein.

SUMMARY OF THE INVENTION

The present invention is a complete process and apparatus for the manufacture of parts using solid models and Boolean operations to generate NC tool paths. The present invention uses solid models of the difference between the stock model and the part model, the "delta volume", to compute the tool paths for machine tools. Tool volumes are then created from the tool paths. The tool volumes are then subtracted from the delta volumes to obtain new delta volumes. This process automates the modeling of sequential tooling operations on the stock to produce a part as it was designed.

The solid models are classified using attributes such as stock, part, and delta volume. Attributes may also be added to faces, holes, edges, vertices and features. The solid models and the attributes attached to the models, faces, features, etc. are used to determine successive depths of cut for the machining process. The user inputs a machining setup and a machining strategy. The system automatically determines the best depths of cut from the solid models and the machining strategy. Each depth of cut is used to generate a slicing plane which is intersected with the solid modeling faces to determine the curves representing regions that the tool may enter. The solid model and the attached attributes are thus used to prevent the tool from gouging the part.

An overview of the solid modeling process for manufacturing parts is shown graphically in FIG. 1. A solid model of the part is first created in block 20. The solid model includes a description of the surface geometry of the part, the topology of the part, and additional information describing features of the part such as holes, tabs and slots. The solid models may be created from scratch, may be created by retrieving a previously created model from a computer library of solid models, or may be created by modifying models obtained from the computer library. An example design model is shown in FIG. 2. FIGS. 2 through 8 were obtained from CRT displays of computer models.

Models of parts are usually created in a design engineering department with the aid of a CAD/CAM design system. These CAD/CAM systems support the creation of solid models using a variety of modeling techniques including the creation of primitive shapes such as blocks and cylinders, extrusion of 2-D closed profiles, and circular sweeps of 2-D profiles. The Boolean operations of union and difference are used throughout the construction procedure. During each operation, the solid modeler maintains computer models that describe the topology and geometry of the resultant solid objects.

Specific features such as holes, pockets, tabs or slots are included in the model of the part. For example, a simple hole can be modeled by subtracting a cylinder from the model of the part, leaving an internal cylindrical face on the model. Information in the form of attributes can then be added to the cylindrical face to describe design intent, such as "for #2 Phillips screw." Machining cycles and tolerances for realizing a hole for a #2 Phillips screw can then be derived.

FIG. 2 shows a computer model of a part 201 as it is displayed on a CRT screen. Part 201 is characterized by, for example, cylindrical holes 202, pockets 203, exterior face 204, interior pocket face 205 and blend surface 206. A blend surface is a surface that describes the transition from one surface to one of its adjoining surfaces, such that paths from the first surface to the second surface are continuous.

A process plan (block 21 of FIG. 1) is used to plan and document the stages of a manufacturing process. The process plan is usually created by manufacturing engineers early in the manufacturing cycle. The process plan may be in "macro" form, e.g., heat treat the part, machine the part using machine tool #12 using stock from bin #2, de-bur the part at work center #15, and route the finished part to inspection. The process plan may include more specific details such as face mill the stock to a depth of 0.15; rough pockets to 0.50 and end mill; spot drill all holes; and drill 0.234 inch diameter holes. Process plans may range from fully documented plans to plans that exist only in the mind of the user.

Three more models are required to define the manufacturing process. These models are: 1) a stock model that represents the exact shape of the raw stock that will be cut on the machine tool; 2) delta volumes that represent volumes of material to be machined away during part manufacture; and 3) models of the machining setup, including the machine table, fixtures and clamps. These resultant models (block 23 of FIG. 1) are used throughout the machining process. The delta volume models are continually updated throughout the manufacturing process. Stock models can be created interactively, but they are usually recalled from existing databases of stock shapes. Machining setup models are also often recalled from existing databases. FIG. 3 shows an example of a stock model 301 as it is displayed on a CRT screen. FIG. 3 also shows clamps 302 and tooling buttons 303. Clamps 302 hold the stock 301 on to the machine table. Tooling buttons are used to precisely position the stock for machining. Delta volumes are created automatically using a solid modeling Boolean operation to subtract the part model from the stock model. The process plan may also subdivide the delta volumes into smaller, more manageable delta volumes. In FIG. 4, it can be seen how the part is to be realized from the stock by positioning a solid model of the part 201 inside the solid model of the stock 301. Finally, by subtracting the part from the stock, delta volumes are defined as shown in FIG. 5. In FIG. 5, delta volume 501 is the volume of the stock 301 that will not remain in part 201. Delta volumes 502 are cylinders representing the material that is to be removed to make holes 202. Delta volumes 503 represent the material to be removed to make pockets 203. The part is manufactured by machining the delta volumes, i.e., the part is produced by programming the machine tool to remove the material defined by the delta volume or delta volumes.

The user may also add simple and/or complex manufacturing attributes when implementing the process plan in block 10 of FIG. 1. Simple attributes such as material type or surface finish for a face are commonly attached to the stock model. Complex attributes such as a set of rules for machining a particular feature such as a pocket or slot are attached to that feature. An example of a complex attribute would be a machining strategy for a pocket, such as: (1) drill entry with tool #1; (2) rough pocket with tool #2; (3) finish pocket floor with tool #3; (4) finish pocket sidewalls with tool #4.

Next, the machine tool for manufacturing the part is selected, as well as the individual setups on the machine (stock positioning, fixturing, clamping, etc.), as represented by block 11 of FIG. 1. In this block, solid models of the machine table, fixtures that attach to the machine table, and clamps to hold the stock to fixtures are modeled. As with models of stock parts, models of the fixtures and clamps are usually selected from a library of pre-defined components. Any models that are not initially in the library are created as the need for those models arise. The fixtures and clamps are positioned interactively, i,e,, the operator positions the models of the fixtures and clamps by moving their images around on a computer-controlled CRT display, using utilities such as rotation and translation, to obtain the correct position and orientation of each fixture or clamp. The output of specifying a machining setup is the definition of the machining environment in block 22, complete with fixture and clamp orientations. Block 11 marks the beginning of an iterative sequence, blocks 11 through 15, that is repeated until all delta volumes have been machined. On subsequent iterations a new setup may or may not be required. In FIG. 3, the machining environment consists of tooling buttons to help position the stock and clamps to hold the stock in place on the machine table.

Once a setup has been defined, individual operations within that setup are planned and processed. The specification of manufacturing operations, block 12, begins with the selection of one or more delta volumes, block 23, to be machined. The user then chooses a machining strategy and a cutting tool to perform the operation in block 24. The output of block 12 is the current delta volume, and the machining strategy, block 25, for removing the delta volume.

Block 13 is the automatic generation of NC tool paths. The inputs to block 13 include current delta volume to be machined from block 25, the related machining strategy, also from block 25, and the definition of the machining environment from block 22. NC tool paths are generated automatically in block 26, and saved for later processing on the actual machine tool. NC tool path generation can include automated roughing, automated finishing or a combination of both, as specified by the user.

Tool paths are verified in block 14. Here, tool volumes are automatically generated to model the total volume of space traversed by the cutting tool for the NC tool path obtained from block 26. Tool volumes are then subtracted from the current delta volume, obtained from block 28, to model any material that was not removed. Material not removed becomes new delta volumes, stored again, that are processed during subsequent machining operations, as shown in block 23. Tool volumes are also subtracted from the stock model, obtained from block 23, to model the exact shape of the stock after the current operation is processed on the machine tool. The modified stock model becomes the current stock model, and is stored in block 23. FIG. 6 shows two tool volumes 601 that resulted from automatic tool path generation of the pockets in the middle of the part. The tool volumes project above the stock because they are modeled for the entire cylindrical length of the tool. When the tool volumes are subtracted from delta volumes, FIG. 7 shows the result of the machining operation. Most of the pocket delta volumes were removed, but some material remains around the walls of the pockets and in the corners of the pockets. This material is modeled as new delta volumes that will subsequently be machined with a different machining strategy.

The process continues until all delta volumes have been machined, block 15, after which all pertinent machining data is gathered in block 26 and processed for use at the numerically controlled machine tool, represented by block 27. FIG. 8 shows the example part 201 begin to emerge out of stock 301 after several machining operations have been performed. Volume 801 represents the volume of stock 301 that has not been actually removed by the tool bit. Gap 802 represents material that has been removed by the tool bit. In order to cut the rest of the material, a different machining setup, to be specified anew in block 11, is required so that the material under the clamps can be removed.

Overall, the present invention is a significant advance in computer-aided manufacturing because, unlike prior art systems, it provides manufacturing engineers with an intuitive and powerful means for developing a strategy for machining a computer-modeled part and for specifying the strategy from which NC tool paths are automatically generated. The present invention also provides manufacturing engineers with an intuitive means for planning, organizing, and communicating processes for the manufacture of parts using automatic tool path generation. This process can achieve a significant increase in productivity over conventional computer-aided manufacturing.

A first object of the present invention is to provide methods for associating machining strategies and machining attributes with models of the part that is to be manufactured, and with models of the stock from which the part is to be manufactured.

A second object of the present invention is to provide methods for modeling the total machining environment.

A third object of the present invention is to provide methods for modeling the material to be removed (delta volumes) exactly.

A fourth object of the present invention is to provide methods for relating machining strategies with the material to be removed (delta volumes).

A fifth object of the present invention is to provide methods for automatically generating roughing tool paths for delta volumes.

A sixth object of the present invention is to provide methods for automatically generating finishing tool paths for all or portions of delta volumes.

A seventh object of the present invention is to provide methods for modeling the material that remains to be cut after each machining operation.

These and other objects of the present invention are described in greater detail in the detailed description of the invention, the appended drawings and the attached claims.

BRIEF DESCRIPTION OF THE DRAWINGS

FIG. 10 is an example file describing a machining strategy;

DETAILED DESCRIPTION OF THE INVENTION

Figure 9:
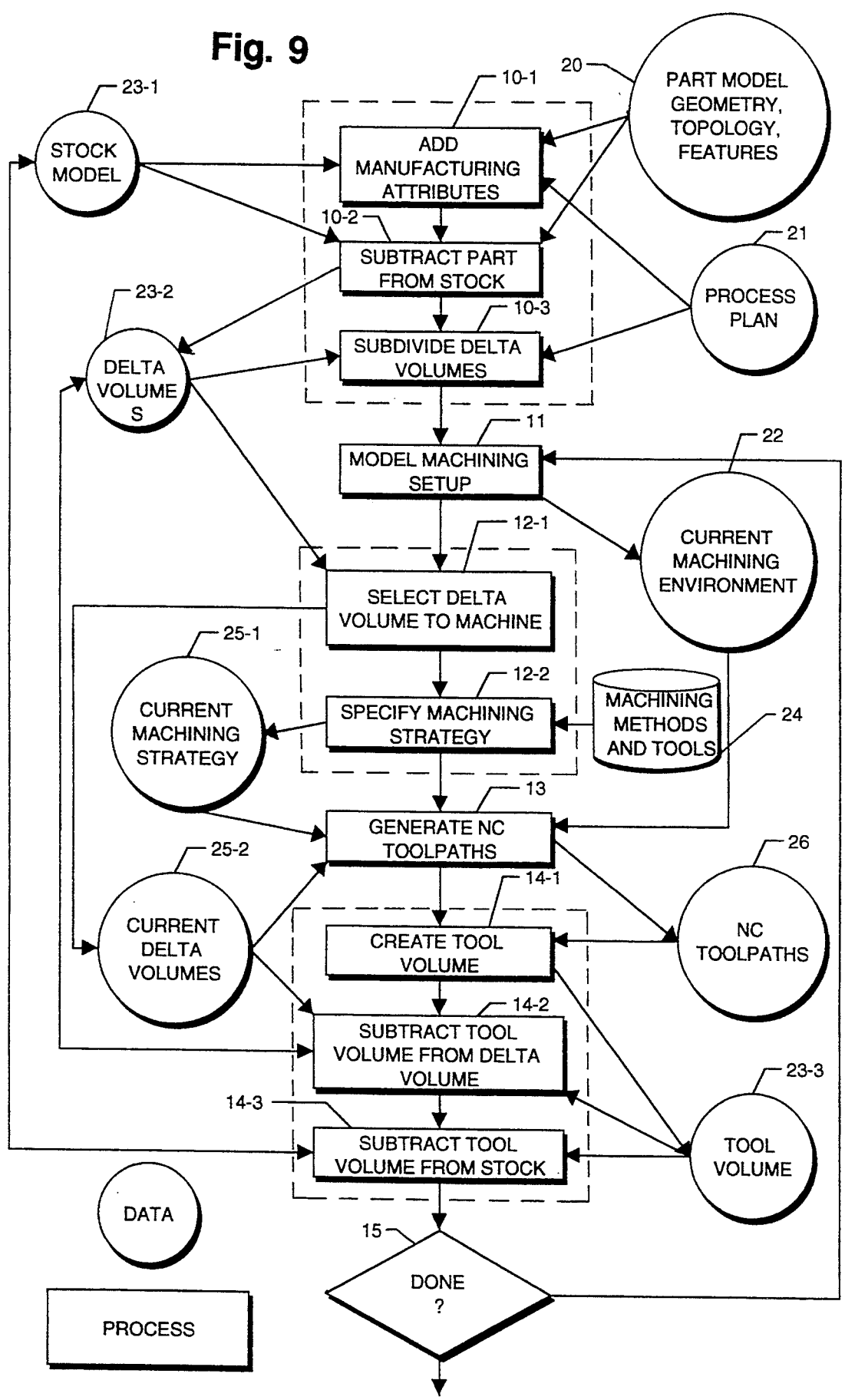
FIG. 9 is a flow diagram describing detailed process flow.

The solids-based machining process is described in detail in FIG. 9. The process discussed herein relies on certain fundamental characteristics of a solid modeler. The solid modeler must be reliable in performing boolean operations, especially with respect to the tangency and coplanarity of surfaces, as is known in the field. The process assumes a solid modeler that is exact (not approximate) which can generate a boundary representation. The modeler must support the creation of user attributes on the model bodies, faces, edges, vertices and features. In addition, the modeler must allow attributes to migrate during boolean operations. A modeler that is suitable for this process is the ACIS ™ Geometric Modeler which is commercially available from SPATIAL TECHNOLOGY INC., Boulder, Colo. Other solid modelers that are suitable for implementing the present invention are the Parasolid modeler, available from McDonnell Douglas Corp., Cypress, Calif.; XOX, available from XOX, Minneapolis, Minn.; and Designbase, available from Ricoh Corp., Japan.

ACIS ™ is written in C++. Specific embodiments of the present invention will be described as applied using ACIS ™. However, the present invention, including each of the specific embodiments described herein, may be practiced with any of the above-listed solid modelers.

Figure 1:
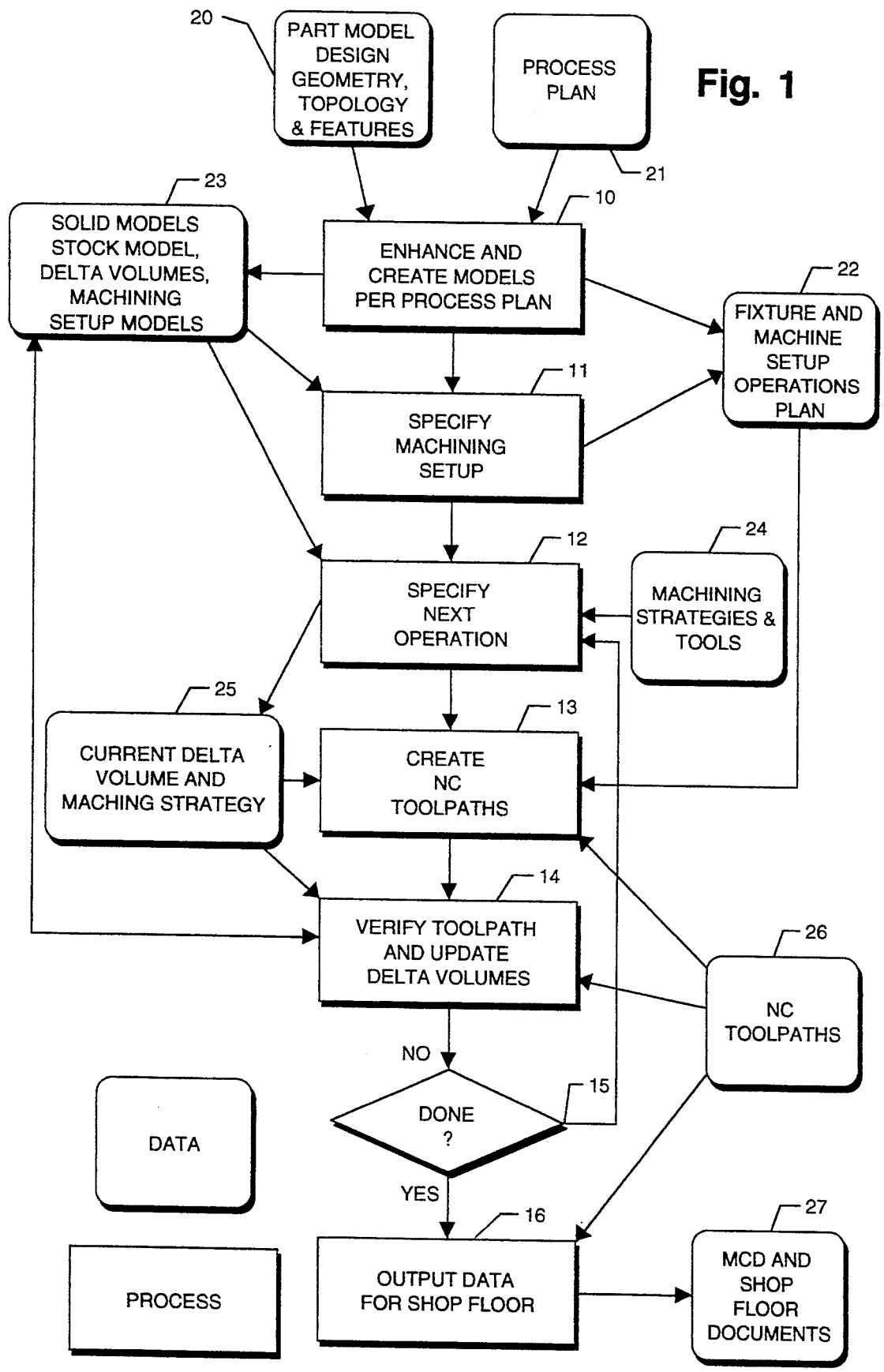
FIG. 1 is a flow diagram for overall software process.
Figure 2:
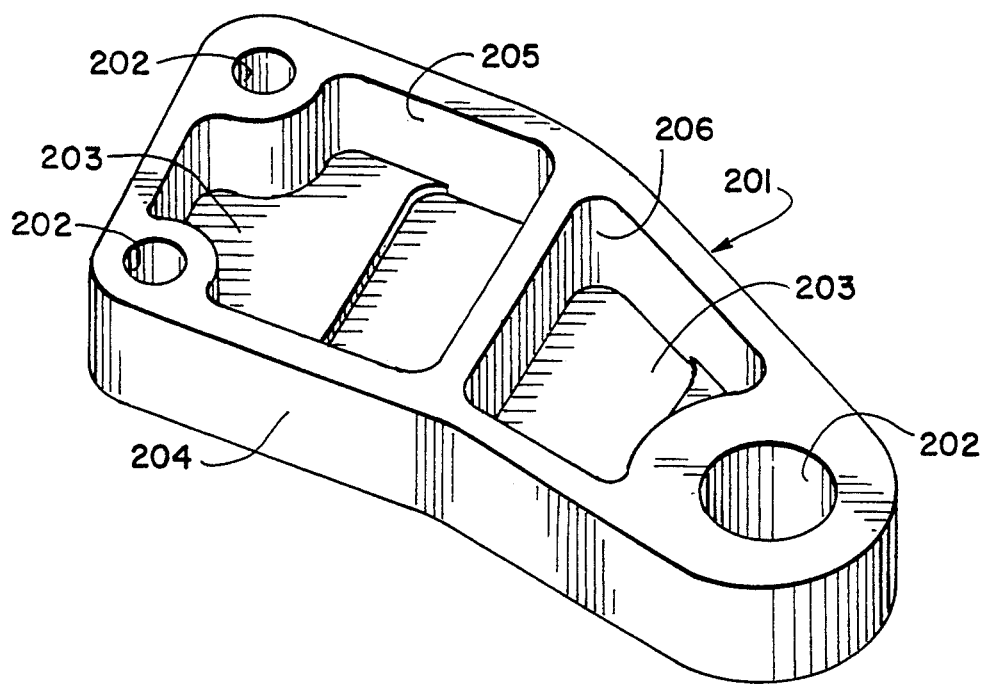
FIG. 2 is an example of part model received from design.
Figure 3:
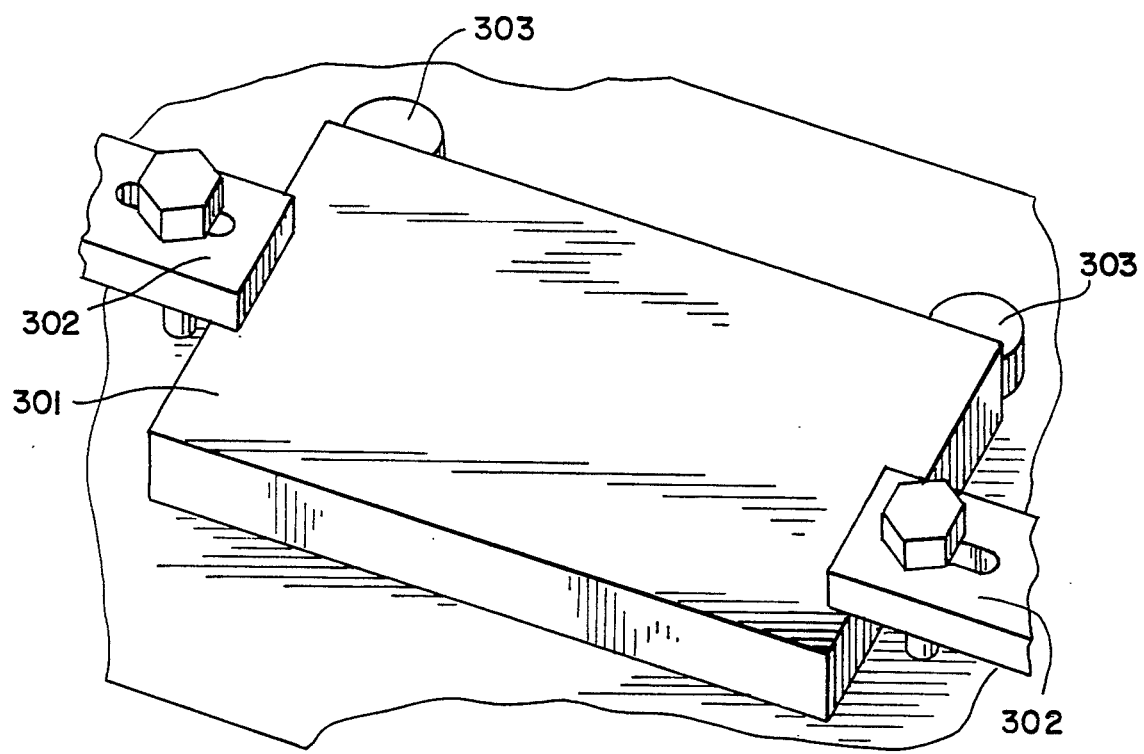
FIG. 3 is an example of stock model from which part will be cut.
Figure 4:
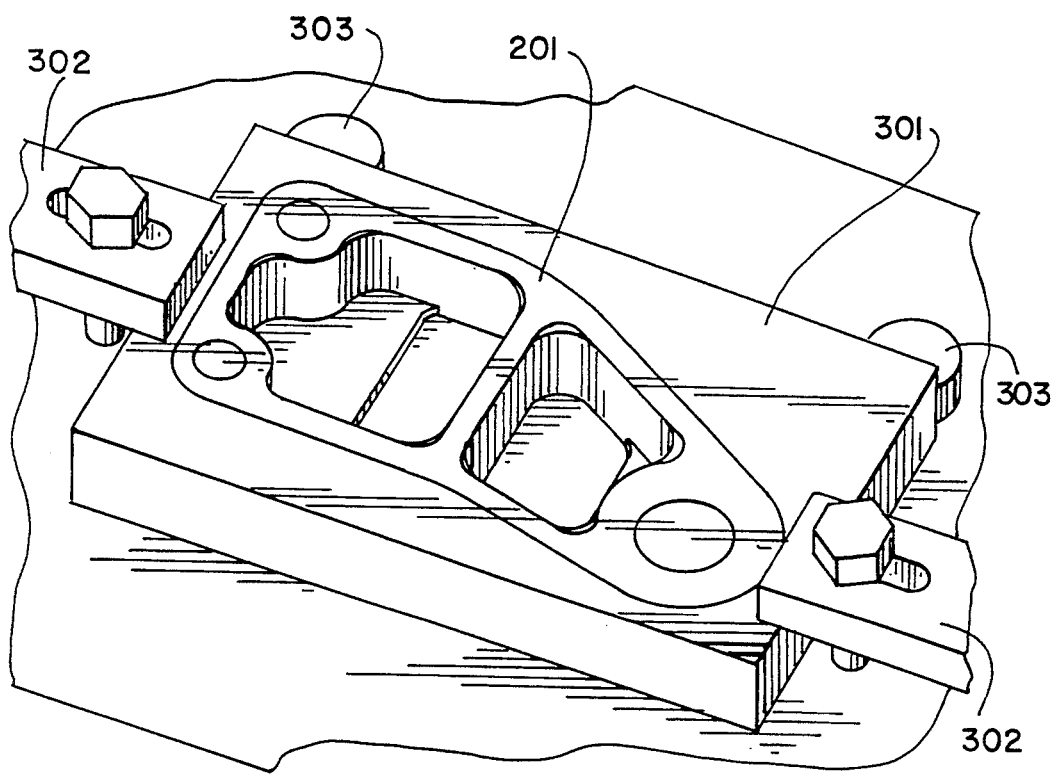
FIG. 4 is an example of part model positioned inside stock model.
Figure 5:
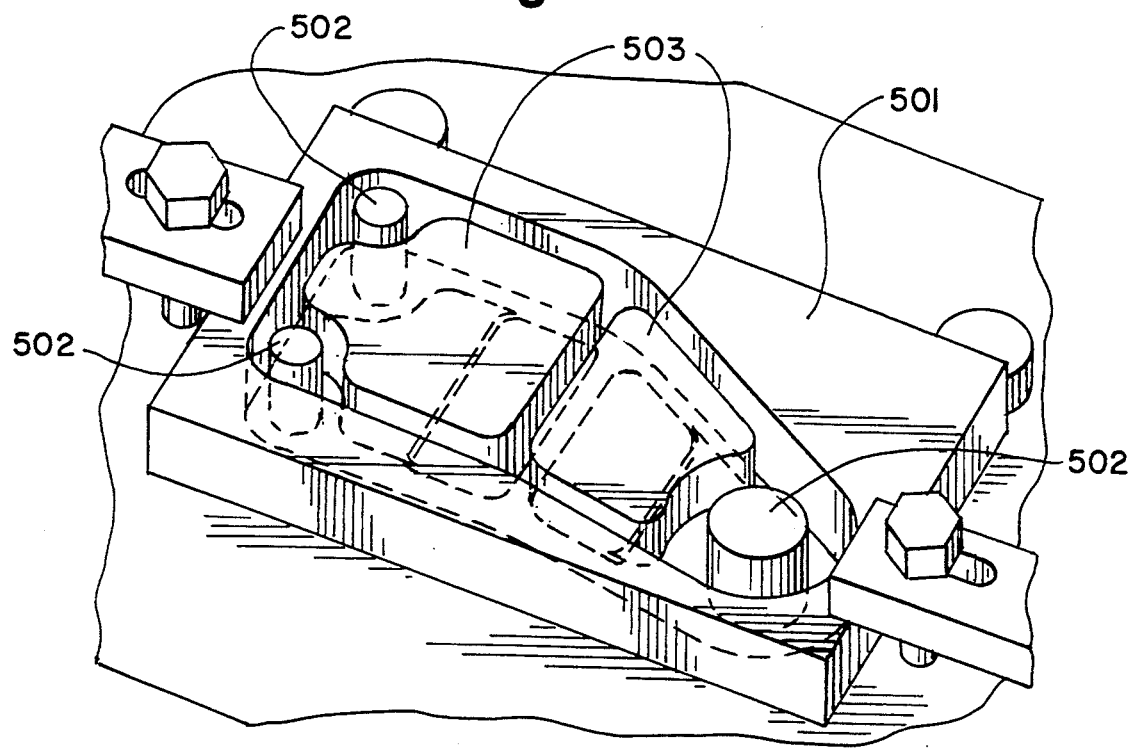
FIG. 5 is an example of delta volumes obtained by subtracting part from stock.
Figure 6:
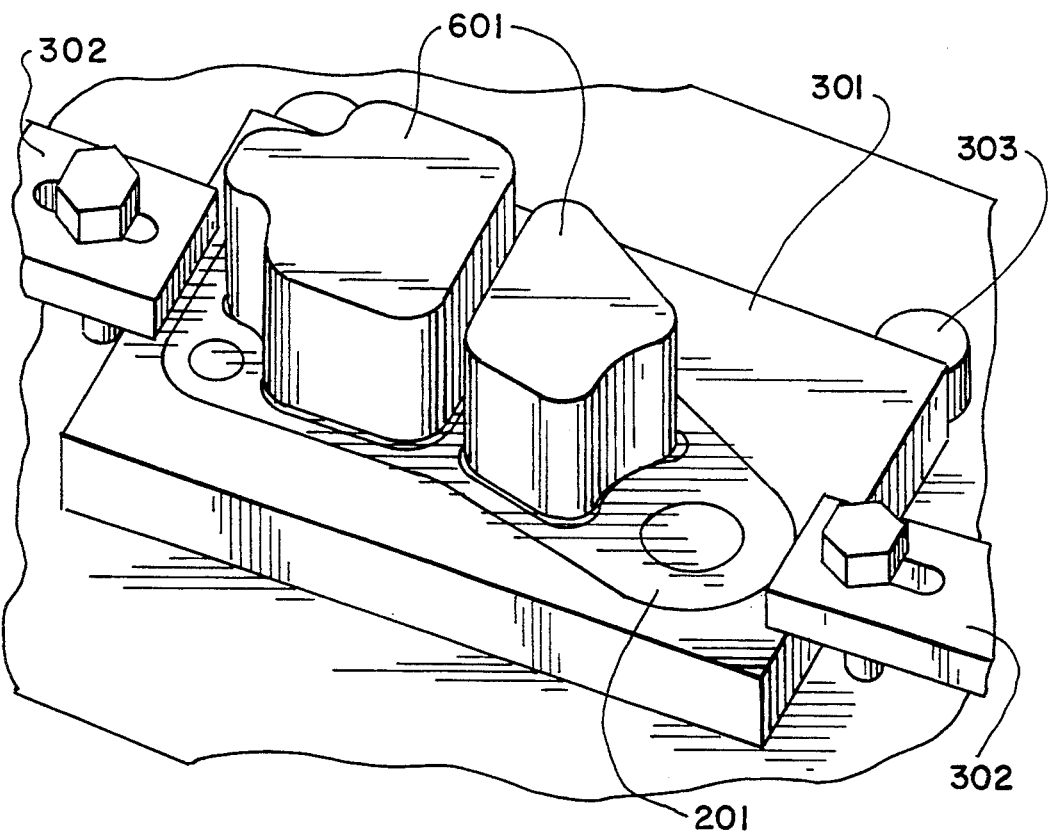
FIG. 6 is an example of tool volumes for two inner pockets of part.
Figure 7:
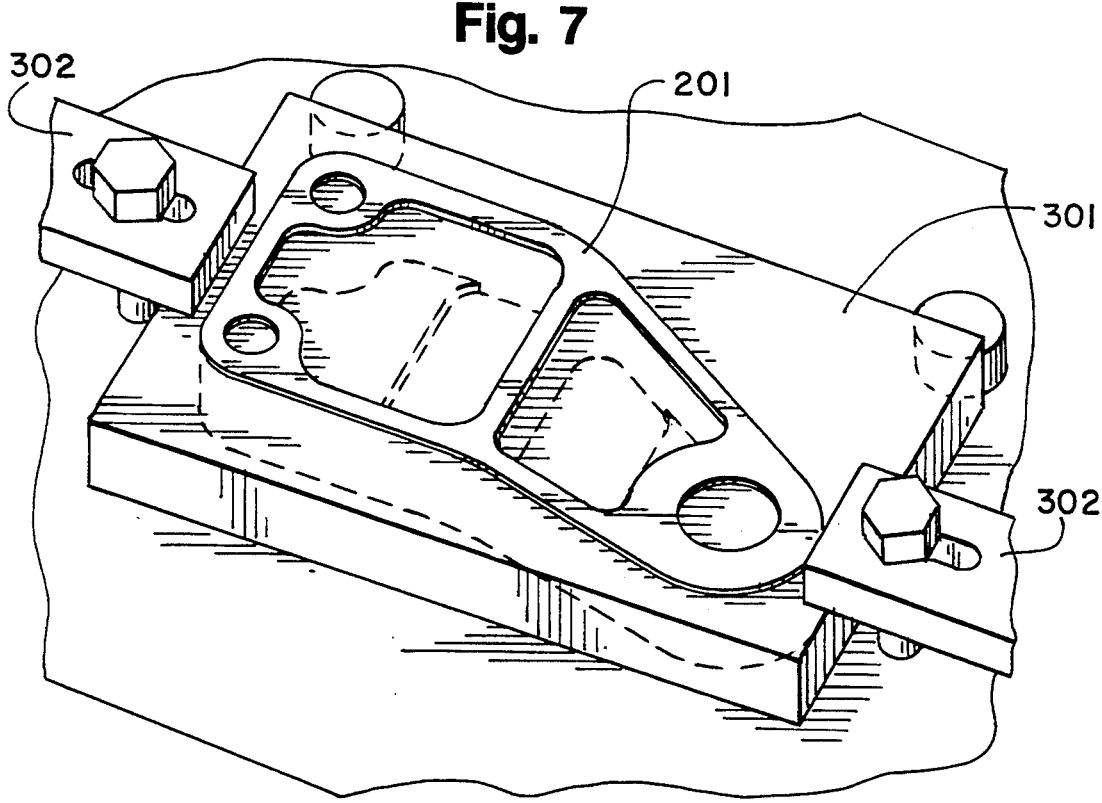
FIG. 7 is an example of a modified delta volume and a modified stock.
Figure 11A:
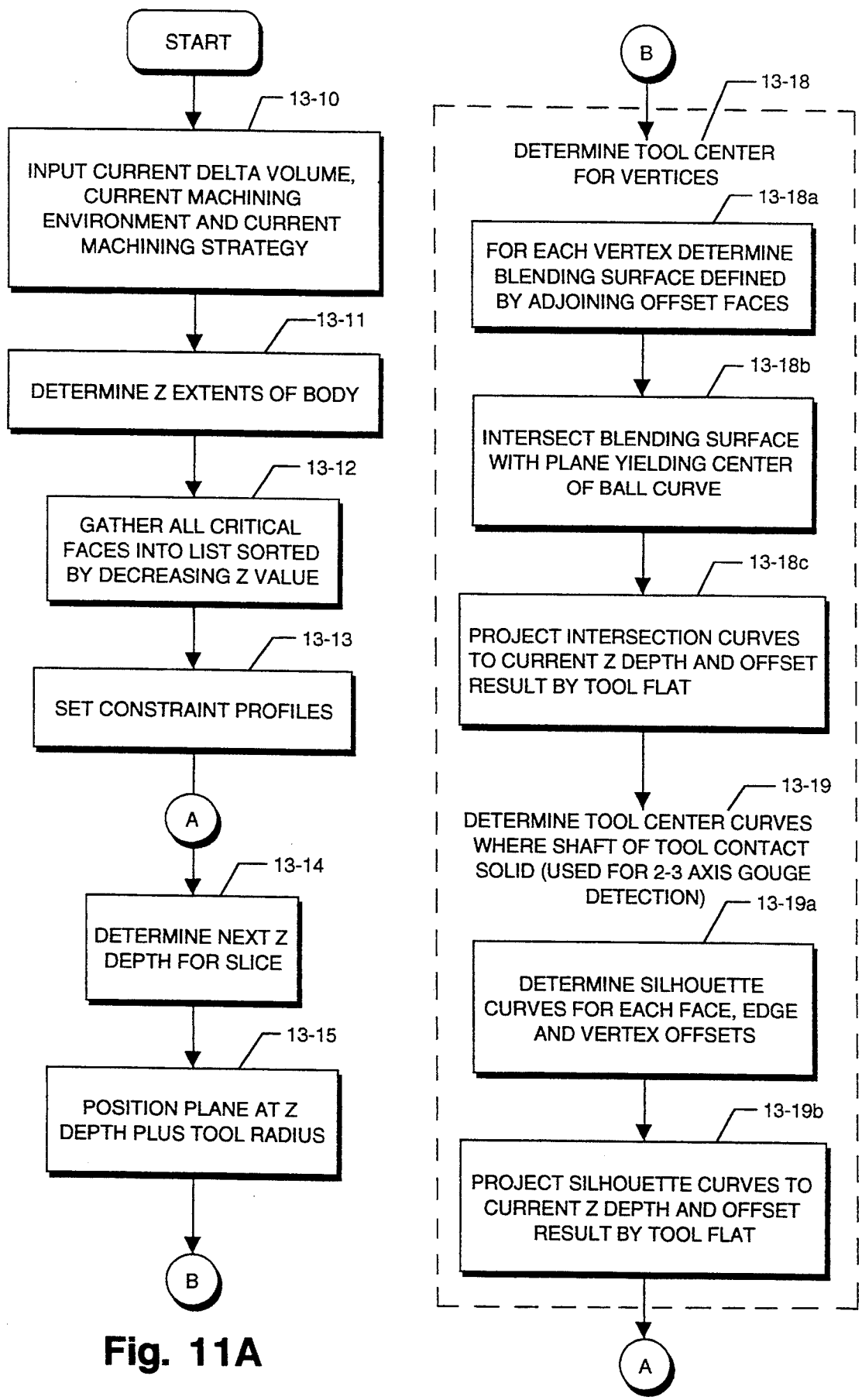
FIGS. 11A and 11B are block diagrams detailing automated NC roughing and finishing.
Figure 11B:
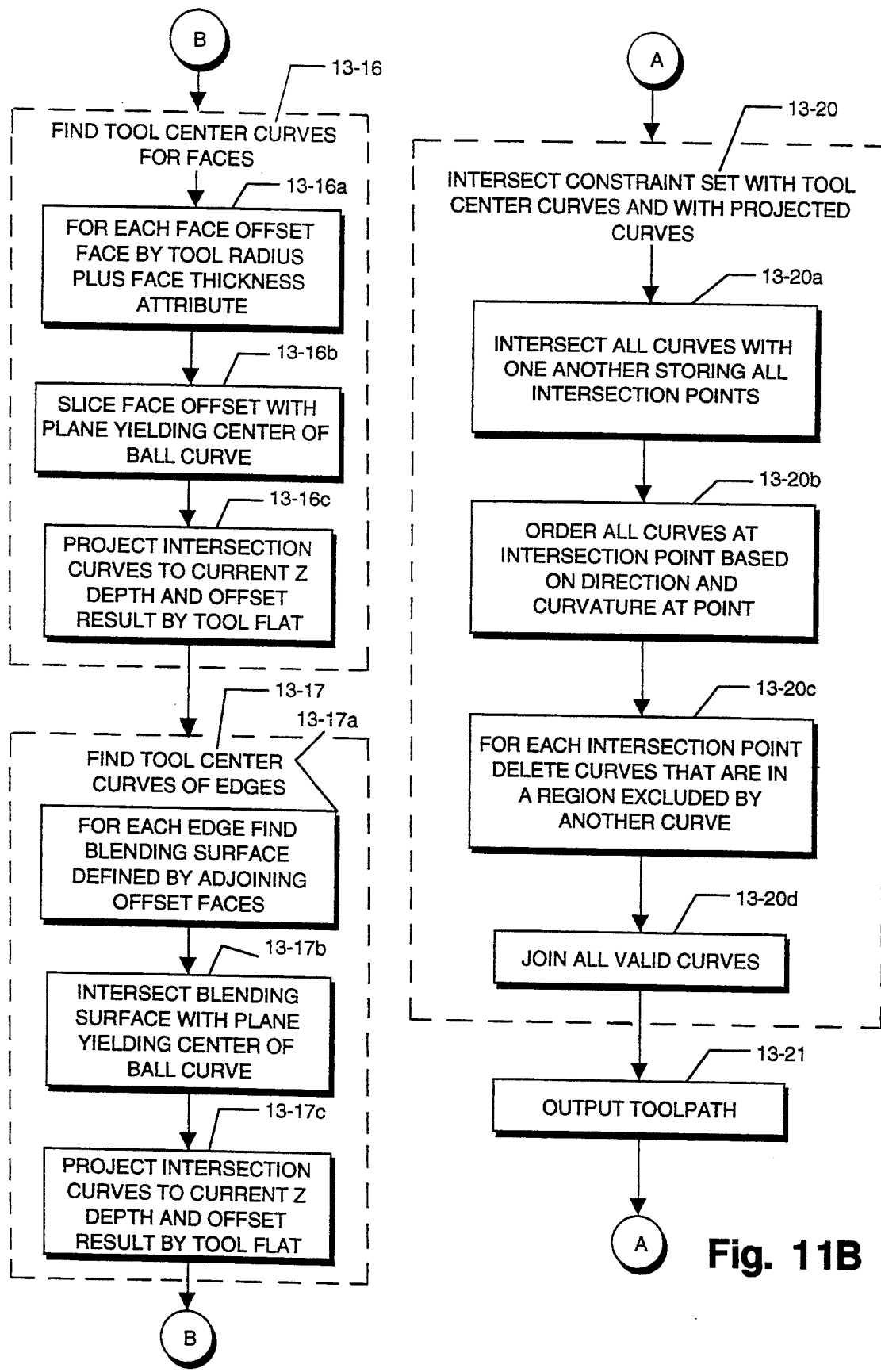
Figure 12:
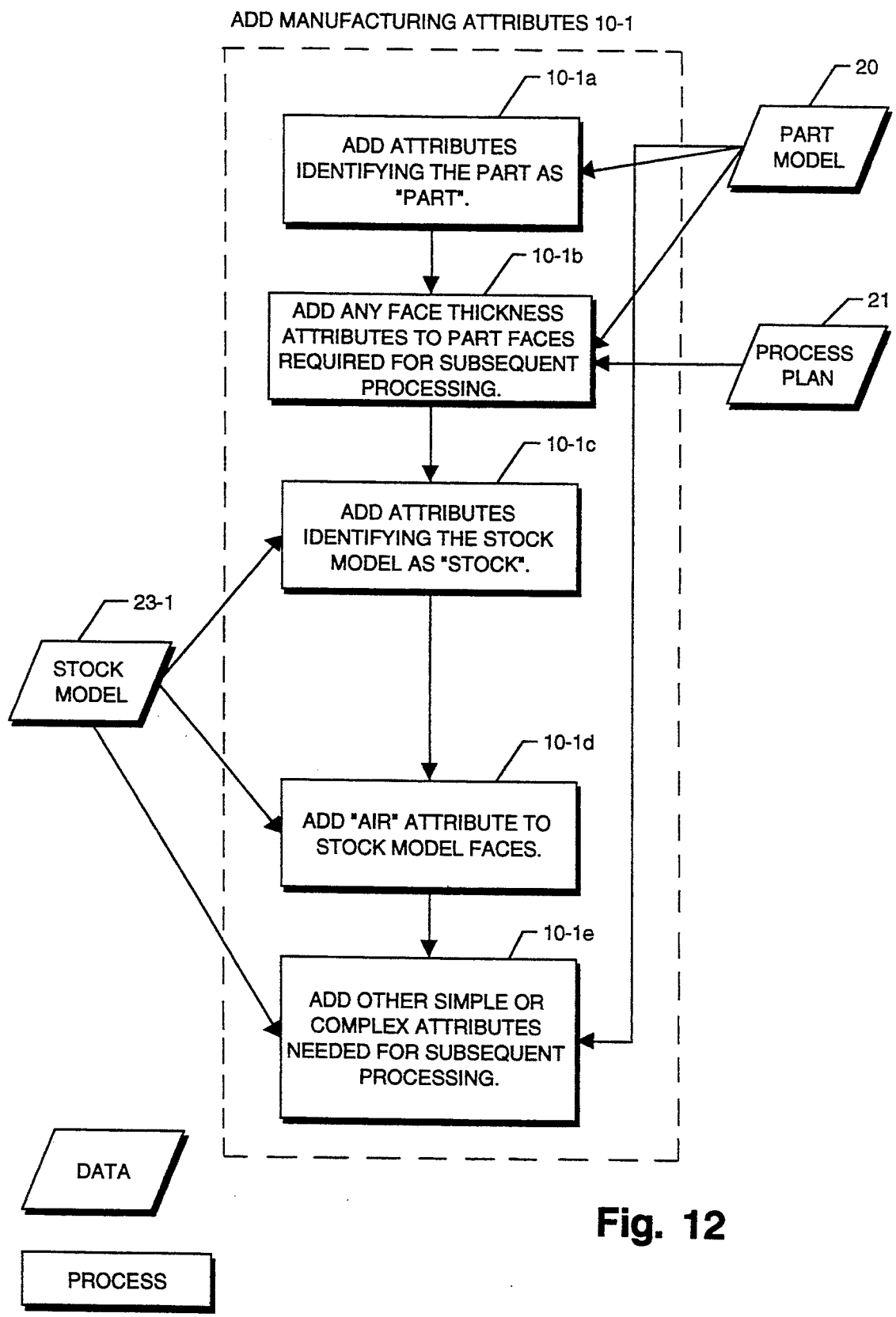
FIG. 12 is a block diagram describing the detailed addition of manufacturing attributes.

A preferred embodiment of the present invention is shown in FIG. 9. Single blocks from FIG. 1 are represented by several sub-blocks in the representation of the preferred embodiment of FIG. 9, e.g., block 10 from FIG. 1 is represented by blocks 10-1, 10-2, and 10-3 in FIG. 9. Similarly, block 25 in FIG. 1 is represented by blocks 25-1 and 25-2 in FIG. 9. Further details of the process shown in FIG. 9 are shown in FIG. 10 (listing an example file describing a machining strategy for block 12-2 of FIG. 9); FIG. 11 (detailing the NC tool path generation, block 13 of FIG. 9); FIG. 12 (listing the substeps followed in block 10-1 of FIG. 9); and FIG. 13 (listing the substeps followed for block 11 of FIG. 9). The steps of the preferred embodiment are described below. Each model created throughout this process carries with it an attribute that specifies what that specific model is a model of, e.g., part models include an attribute identifying the model as a model of a part and delta volume models include an attribute identifying the model as a model of a delta volume.

STEP 1: CREATE SOLID MODEL OF THE PART. As shown in block 20 of FIG. 9, the process begins with a solid model description of the mechanical part to be machined. The model may be created from scratch, by retrieving a previously stored model, or by modifying a previously stored model. The model of the part carries with it an attribute that identifies that specific model as a model of a part.

STEP 2: DEVELOP A PROCESS PLAN FOR MACHINING THE PART. The next step is to develop a process plan, block 21, for machining the part. This step may be carried out before or after steps 3, 4, 5 or 6. The process plan is the overall conceptual plan describing how the part is to be machined. It is carried out in conjunction with steps 3, 4, 5 or 6, not independently of them, i.e., the process plan may be adjusted based upon information developed in steps 3, 4, 5, or 6. For example, difficulty in developing a machining strategy in step 3 for a specific feature may require modifying the process plan to eliminate the source of the difficulty.

The process plan guides the user's actions throughout the process. For example, the process plan may call for the stock material to be Aluminum #1. The user would implement this specification by entering "Aluminum #1" as the material property attribute to the stock model. If the process plan calls for 0.0001 tolerance on selected holes, the user would enter "0.0001" as the hole diameter tolerance attribute on all the selected holes.

STEP 3: ADD MANUFACTURING ATTRIBUTES TO THE PART. Manufacturing attributes can be added (10-1) to the entire part model as well as to features, faces, edges, etc. of the part. Techniques for adding attributes to solid models are well known in the solid modeling field. They generally comprise inputting data to additional data fields associated with the body of the part, each face of the body, each edge of the body and each vertex of the body. For example, all faces of the part model are marked with a simple attribute that identifies each face as bordering "part."

Manufacturing attributes can range from simple to complex. An example of a simple attribute is a real number attached to the face of a part that identifies the material thickness to be left on the face after roughing tool paths are completed. A complex attribute might be a complete machining strategy for a feature. For example, a machining strategy for a pocket feature could be to perform a drill entry to the pocket, rough out pocket, finish pocket side walls and finish pocket bottom. These and other attributes are used during NC tool path generation, block 13, to provide appropriate tool control, as described below with reference to FIG. 11.

There are a number of ways to model complex attributes. The embodiment described herein uses a text field attribute that contains an external file name. The external file contains statements (a macro) that control the machining operations through each machining step. This can include the selection of one or more cutting tools, selection of the machining method, and the modeling of intermediate delta volumes through each pocket machining stage.

The process for adding machining attributes, block 10-1, is shown in more detail in FIG. 12. The process begins by adding simple attributes to the part model identifying each of its faces as bordering "part" block 10-1a. Next, face thickness attributes are added to any part faces, block 10-1b, as determined by the process plan (block 21 of FIG. 9). Other simple or complex attributes can be added as necessary for the tool path generation, block 10-1e.

STEP 4: CREATE SOLID MODEL OF THE STOCK. The user then creates a solid model of the stock, block 23-1, from which the part will be cut. Steps 3 and 4 must be taken before step 5, but may be taken in any order. The stock model may be interactively created, or it may pre-exist and be selected from a library of stock models. Stock attributes are added in the same manner as part attributes or manufacturing attributes. Attributes which are added at this point include attributes which identify the stock model as "stock", block 10-1c, and "air" attributes which identify the stock model faces that touch air, block 10-1d. The "air" attribute can contain a numeric value that indicates the distance the tool will be allowed to travel out of the stock and into the air. Stock attributes also include material attributes defining the material of the stock, including the type of material. The material type is used during NC tool path generation to select, for example, the depth-of-cut, the machine tool, the feedrate of the tool, the cut pattern, the step-over distance, the direction of the cut, the type of the cut (conventional or climb) and the cutting tool requirements. Faces of the stock model can also be marked as bordering "air" so optimum tool control can be achieved during NC tool path generation (block 13 in FIG. 9).

STEP 5. SUBTRACT PART FROM STOCK. Once the part model and stock model are defined, the total material to be machined is determined by subtracting the part model from the stock model, block 10-2. This volume of material is represented as one or more solid models called delta volumes, block 23-2. During this Boolean operation, machining attributes migrate from the part and stock models to the corresponding faces of the delta volume(s), i.e., the relevant attributes of the part and the stock are automatically attached to new faces created by the Boolean operation. This allows, for example, the tracking of "part" faces (those from the part model) on the delta volume. Attribute migration is handled automatically by the solid modeling system.

STEP 6. SUBDIVIDE DELTA VOLUME. The user can then subdivide delta volumes into smaller delta volumes, block 10-3, as required by the process plan, block 21. This may also be done so that individual delta volumes conform to the user's machining strategy. For example, a top rectangular portion of a delta volume may be subdivided into a separate delta volume that can be machined using a "facing operation". Delta volume subdivision is, for example, done interactively or by an expert system, using solid modeling sectioning operations that create two or more new solid models (i.e., the delta volumes).

When a delta volume is subdivided, new faces are created on the models. During delta volume subdivision, an attribute "delta volume" is added to newly created faces so that the faces can be identified as bordering another delta volume (not "air" or "part"). An attribute is also assigned that identifies the other delta volume each new face adjoins. This information can be used later during NC tool path generation to determine where the cutting tool can and cannot go. Upon completion of the delta volume subdivision process, the total volume of material to be machined is represented as a list of delta volumes in block 23-2.

STEP 7. MODEL MACHINING SETUP. The user then models a machining setup in block 11 to support one or more machining operations. The machining set-ups are used to orient the stock, the fixtures and the clamps on the machine tool. The setups are represented as solid models of clamps, fixtures, machine table, etc. and they are held as solid models called the current machining environment in block 22. The user selects the machine tool. Once the machine tool is selected, the user can access libraries of tools and fixtures that operate with the selected machine tool. Machine limits such as horizontal and vertical travel limits are identified. The user interactively selects, positions, and verifies the fixtures, clamps, tooling buttons and other components of the machining environment by creating the models of these components, and positioning them on the CRT screen. The user may also design specific fixtures and clamps (see blocks 23-4 and 23-5 of FIG. 13).

Figure 13:
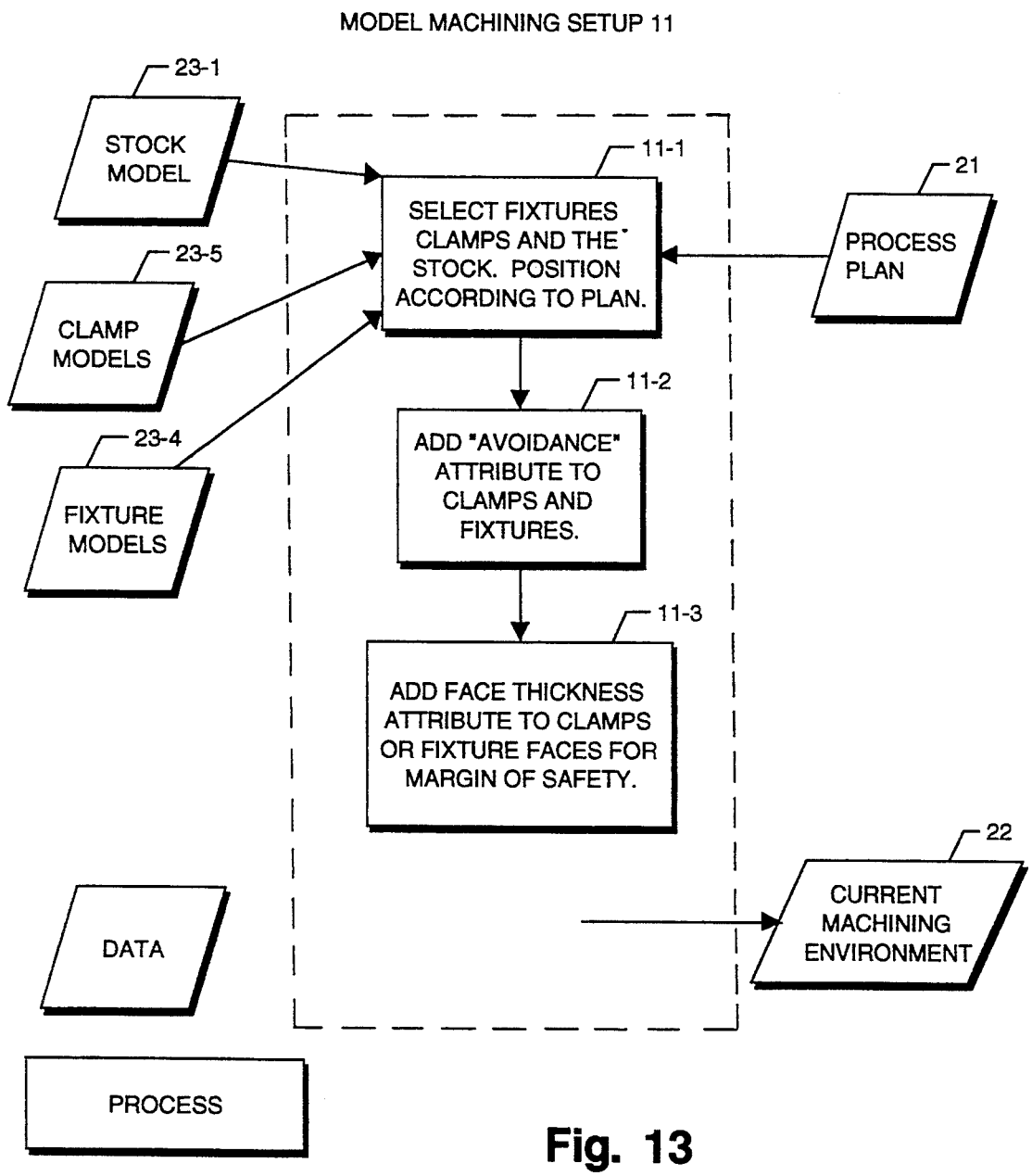
FIG. 13 is a block diagram describing the detailed modeling of the machining setup.

The fixtures, clamps and stock are selected according to the process plan using the manipulating functions of the solid modeler, block 11-1 of FIG. 13. An "avoidance" attribute is added to the clamps and fixtures making them invalid places for the tool to enter during STEP 10, block 11-2. A face thickness attribute can be added to the faces of the clamps and fixtures in block 11-3 to keep the tool away from the clamps and fixtures by a margin of safety.

The position and orientation of the models representing the machining environment defines the volumes that the tool cannot enter. An attribute "avoidance" is added to each face to identify it as a fixture or a clamp. This machining environment is used by the NC tool path generation algorithms in block 13 to avoid generating tool motion that can interfere with machine components, as described below with reference to FIG. 11.

STEP 8. SELECT A DELTA VOLUME TO MACHINE. The user then selects a delta volume to machine, block 12-1, from the list of delta volumes remaining to be machined stored in block 23-2. The delta volume selected becomes the "current delta volume" and is stored in block 25-2.

STEP 9. SPECIFY MACHINING STRATEGY. The user then specifies a machining strategy in block 12-2. Machining strategies can be interactively defined or selected from a library of existing machining methods in block 24. A machining strategy is specified and stored in a machining strategy file, block 25-1, with parameters that select the tool, describe the types of tool entries and exits to be employed, the type of cut pattern, maximum depth of cut, how coolant is to be controlled, etc., as dictated by the user's experience and skill. An example of a machining methods file is shown in FIG. 10.

STEP 10: NC TOOL PATH GENERATION. The current delta volume, from block 25-2, the current machining strategy from block 25-1, and the current machining environment from block 22 are then submitted for the automatic generation of NC tool paths in block 13 and stored in block 26. The NC tool paths that are generated will work completely through a delta volume removing as much material as possible given the machining environment and the machining strategy employed. Complete model information is used for all cuts to determine not only where the cutting tool can and cannot go, but also to determine optimum machine tool feedrates based on how much material surrounds the tool at any one time.

NC tool path generation comprises two main portions, automated roughing and automated finishing.

Automated roughing and finishing comprise taking a series of two dimensional ("2-D") planar slices across an offset delta volume. The slices are taken perpendicular to the tool approach direction and result in one or more 2-D profiles (these are 2-D because Z remains constant across a profile). The profiles are then submitted to NC algorithms for the generation of roughing or finishing tool paths. During roughing, resulting profiles are "area cleared", and during finishing, resulting profiles represent the finish tool path.

Tool path generation, block 13 of FIG. 9, is shown schematically in FIG. 11. It comprises the following substeps:

Substep 10-1. Input Current Status. Tool path generation begins with block 13-10, in which the current delta volume, current machining environment, and current strategy are input. The current delta volume is described in FIG. 9. The current machining environment is represented by zero or more solid models representing fixtures, clamps, the machine table, etc. Solid models comprising the current environment have been assigned attributes that classify each model as an "avoidance" volume (this attribute assignment was done in block 11 of FIG. 9). The current machining strategy consists of the current tool and current machining method. This strategy is represented by a list of variable assignments. A detailed example is given in FIG. 10. Most variables used in the machining strategy are standard controls used in classical CAD/CAM surface and wireframe machining systems. Those which are specific to solids-based machining are discussed below.

Substep 10-2. Determine Maximum and Minimum Z-coordinates. The maximum and minimum Z coordinate values (Z-axis aligned with tool axis direction) for the current delta volume are then determined (block 13-11). These Z extents are needed to determine start and stop positions for slicing and control (blocks 13-14 through 13-21 in FIG. 11). Z extents for a delta volume are maintained and supplied by the underlying solid modeling system.

Substep 10-3. Check Critical Planar Faces. All planar faces of the delta volume that are perpendicular to the tool approach direction are then checked (block 13-12) to see if a "critical" attribute has been assigned. For example, critical faces that must be machined to within a certain tolerance were assigned a FACE_THICKNESS attribute in step 10-1 of FIG. 9. Optionally, all planar part faces with a face perpendicular to the tool approach direction may be designated as critical faces. Such faces must be facing towards the tool and be within a user-specified tolerance of the perpendicular direction. Critical planar faces are assigned a value equal to the Z coordinate of the face (Z-axis in direction of the tool axis) plus FACE_THICKNESS. These faces are organized in a list, sorted from maximum to minimum in Z, and are used in substep 10-6 below.

Substep 10-4. Specify 2-D Constraint Profiles. The user can optionally specify one or more 2-D constraint profiles (block 13-13) to further control where the cutting tool can and cannot go. A constraint profile is used internally in the algorithm to generate a volume. This is done by projecting the constraint profile through the Z-extent of the delta volume (determined in substep 10-2). Constraint volumes intersected with the delta volume define the volume which the tool must stay within. In this embodiment of the algorithm, constraint profiles are identified by the user using standard interactive techniques.

Substep 10-5. Iterate to Remove Entire Delta Volume. The following substeps 10-6 to 10-13 are repeated until the entire delta volume has been processed, i.e., until the CURRENT_DEPTH is below the minimum Z coordinate determined in substep 10-2.

Substep 10-6. Determine Z-Depth. The Z depth at which the next machining operation will occur for the delta volume is determined as follows. A variable CURRENT_DEPTH (initialized to Z_MAX in substep 10-2) defines the position of the previous machining pass. Variable NEXT DEPTH is set to "CURRENT_DEPTH+DEPTH_OF_CUT" where DEPTH_OF_CUT is the maximum step in the Z direction (part of the current-machining strategy). All the critical faces that were identified in substep 10-3 are then checked to see if there are any required cuts between CURRENT_DEPTH and NEXT_DEPTH. If a critical face is found, NEXT_DEPTH is set to the face depth with the largest Z value between CURRENT_DEPTH and NEXT_DEPTH.

Substep 10-7. Create an Infinite Plane (block 13-15). An infinite plane is then created (block 13-15) positioned at "NEXT_DEPTH+TOOL_RADIUS" with the plane normal pointing in the direction of the tool axis. TOOL_RADIUS is part of the machining strategy. This plane will be used as the slicing plane in subsequent steps of the algorithm.

Substep 10-8. Determine Tool Center Curves for Each Face (block 13-16). The tool center curves for each face are determined. Each face of the delta volume is offset by a value equal to "TOOL_RADIUS+FACE_THICKNESS" (block 13-16a). FACE THICKNESS is a user attribute that defines the minimum amount of material to be left on the face after this machining step is completed. Methods for offsetting faces are well known in surface modeling.

Each offset face is then intersected (sliced) with the plane defined in substep 10-7 (block 13-15) to yield a set of curves (block 13-16b). The curves are directed so that material on the left is invalid when looking in the direction of the curve. The resultant curves are projected to NEXT_DEPTH and offset by TOOL_FLAT (from the current tool description) to yield a set of curves (13-16c). These curves represent the position of the tool tip tangent to the offset faces. Algorithms for projecting and offsetting curves in three dimensions are well known in surface modeling.

SubStep 10-9. Determine Tool Center Curves for Each Edge (block 13-17). Tool center curves for edges are then determined. For each edge of the delta volume, a blend surface with a radius of curvature equal to the tool radius plus the face thickness is defined between the offset faces (block 13-17a) that join the edge under consideration. The calculation of a blend surface between two faces (trimmed surfaces) is well known in the surface modeling field. The resulting blend surfaces are intersected (sliced) with the slicing plane to yield a set of curves (block 13-17b). The curves are projected to NEXT_DEPTH and then offset by TOOL_FLAT (current tool) to yield a set of curves (block 13-17c). These curves represent the position of the tool tip tangent to the offset edges.

Substep 10-10. Determine Tool Center Curves for Each Vertex. Tool center curves for vertices are then determined (block 13-18). For each vertex of the delta volume, a blend surface is defined between the offset faces (block 13-18a) that share the vertex under consideration. The resultant blend surfaces are intersected with the slicing plane to yield a set of curves (block 13-18b). The curves are projected to NEXT_DEPTH and then offset by TOOL_FLAT (current tool) to yield a set of curves (block 13-18c). These curves represent the position of the tool tip tangent to the offset vertices.

Substep 10-11. Calculate Silhouette Edges. Silhouette edges (sometimes referred to as view edge curves) are used for detecting and avoiding undercutting. The silhouette edges are calculated (block 13-19) for each of the offset face, edges and vertex surfaces generated in substeps 10-8 through 10-10 above. The viewing direction used to calculate silhouette edges is from the Z direction (looking from the direction the cutting tool approaches the delta volume). All silhouette edges that lie above the current slicing plane are projected (13-19b) to the current Z depth (NEXT_DEPTH+TOOL_RADIUS). Silhouette edge calculation is well known in the solid modeling field.

Substep 10-12. Organize the Curves into Profiles. All the necessary curves have been determined, and the task becomes one of organizing the curves into profiles. The algorithm is similar to a 2-D Boolean operation. First, all the curves calculated in substeps 10-8 to 10-11 are intersected to obtain and store their intersection points (block 13-20a). Intersection points represent the places where a curve goes from a valid to an invalid region. For example, if the curves calculated in substeps 10-8 to 10-11 are in the form of two intersecting pairs of parallel lines enclosing a valid region which is square, then the process must find the intersection points at the four corners of the square. Each curve would then be divided into three segments. The segments outside the intersection points are discarded, leaving just the four curve segments defining the boundaries of the square. Thus the decisions as to which curve segments should be discarded are made at the intersection points.

Each curve at an intersection point is split into an entry segment and an exit segment and associated with the intersection point. Entry and exit segments are determined using the direction of the original (unsplit) curve, the convention being that it is invalid to place the cutting tool to the left of a directed curve.

Substep 10-13. Defining Invalid Regions. At each intersection point, each segment of the curve entering and exiting defines a region that is invalid for the cutting tool. The cutting tool could not enter the invalid regions without gouging the part. By convention, the invalid region is taken to be to the left of the curve segment (when viewed in the direction of the curve).

All the intersection points are then considered in an arbitrary sequence. The steps necessary for determining the invalid regions around each individual point are described. All curve segments that share an intersection point are ordered (13-20b) based on their entry angle around this point, using curvature to order curve segments having the same entry angles. Entry/exit curve pairs determine regions that are valid for the tool to enter. For a selected curve segment, iterate in counter clockwise order about the intersection point until an entry curve is found which is followed immediately by an exit curve. From this exit curve "A" iterate counterclockwise through all exit curves until an entry curve "B" is found. All exit curves between "A" and "B" are eliminated. Similarly, iterate clockwise from the original entry curve eliminating all entry curves until an exit curve is found. The result is a single entry/exit curve pair for the intersection point under consideration which corresponds to the path the tool will take when passing through the point. Eliminate the entry/exit curve pair as identified, and repeat the process until all entry/exit curve pairs have been identified for the intersection point. Each entry/exit curve pair must be compared with the part volume, constraint volumes, and avoidance volumes derived from the models of the stock part, the clamps and fixtures, and the machining environment. An entry/exit pair is eliminated if it lies within one of these invalid regions.

After processing all intersection points, all paired entry/exit curves are joined yielding a sequence of closed paths corresponding to the tool cycling around the part (at the given Z level). These are the constraint curves (tool path profile). During automated roughing, the tool path profile is area cleared, and during automated finishing, the tool path profile represents the finish tool path for the current level.

STEP 11. CREATING THE TOOL VOLUME. The next process step, as shown in FIG. 9, is to create a tool volume (14-1) from the NC tool path stored in block 26. A tool volume (23-3) is an exact solid model that represents the total volume of space swept out by the cutting tool during complete traversal of the NC tool path.

Figure 8:
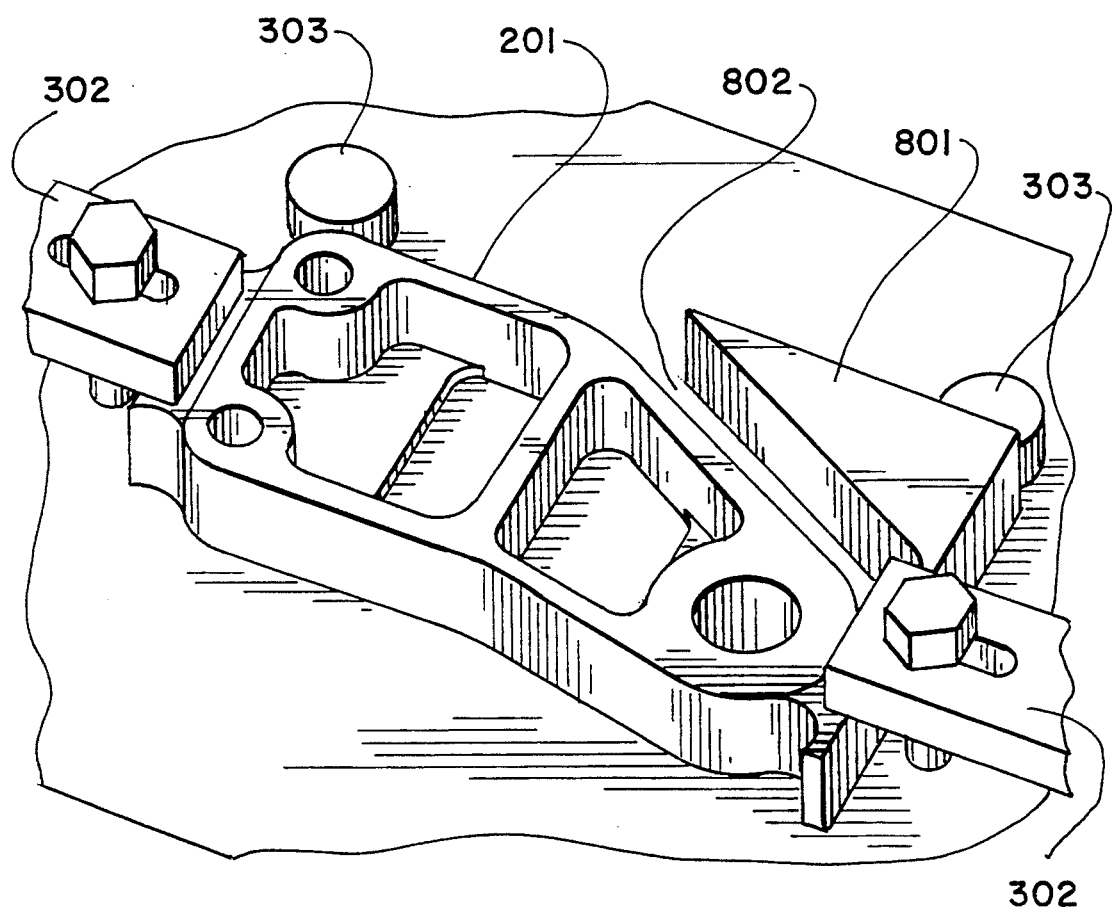
FIG. 8 is an example of a stock model after several iterations through the process.

The tool volume is then subtracted from the delta volume (14-2). By subtracting the tool volume (where the cutting tool moved in space during the cut) from the delta volume, either the entire delta volume disappears or a portion of the delta volume remains. Portions of the remaining delta volume completely separated from the part, such as delta volume 801 in FIG. 8, no longer need further machining. If the delta volume adjoining the part disappears, the NC tool path was successful in machining all material. If a portion of the delta volume remains adjoining the part, the NC tool path could not remove all the material. Any delta volumes remaining are added to the list of delta volumes yet to be machined, block 23-2. These delta volumes may have to be machined using a smaller tool.

STEP 12. MODELING THE INCREMENTAL CHANGES IN THE RAW STOCK. The tool volume is used to model the incremental changes that the raw stock undergoes. This is performed by geometrically subtracting the tool volume from the stock model (23-1). The resulting stock model (23-1) can be used as visual documentation for process plans and for algorithmic verification and/or analysis.

STEP 13. END? If all delta volumes have been removed (15), the process terminates. If more delta volumes remain to be machined, the process is repeated starting with STEP 7, i.e., block 11 of FIG. 9. The process may also be ended with some delta volume left unremoved, for example because the user may have chosen to do so or because that unremoved delta volume cannot be machined. The decision to leave some delta volume unremoved is made in the process plan (step 2 above).

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A process for manufacturing a part comprising the steps of:
   (1) obtaining a computer model of the part using a solid modeler;
   (2) obtaining a computer model of a stock piece using the solid modeler;
   (3) obtaining a process plan for manufacturing the part;
   (4) associating manufacturing attributes with the model of the part;
   (5) determining at least one delta volume to be removed from the stock piece by subtracting the model of the part from the model of the stock and migrating the manufacturing attributes from the model of the part to a corresponding face of the at least one delta volume;
(6) obtaining a model of a manufacturing setup;
(7) obtaining a machining strategy;
(8) computing tool paths for numerically controlled manufacturing equipment having a cutting tool from the at least one delta volume in accordance with the machining strategy and the model of the manufacturing setup;
(9) computing at least one tool volume representing the total volume of space swept out by the cutting tool;
(10) subtracting the at least one tool volume from the at least one delta volume to obtain a new delta volume;
(11) subtracting the at least one tool volume from the model of the stock piece, thus modeling the machining of the tool paths and verifying that the tool paths have not intruded into the model of the part and thus that the cutting tool will not gouge the part;
(12) repeating steps (7) through (11) until the removal of the at least one delta volume has been modeled; and
(13) manufacturing the part according to the process plan by transferring the tool paths to the numerically controlled manufacturing equipment, wherein steps (1) through (7) may generally be carried out in any order provided that step (1) must precede step (4), steps (1) and (2) must precede step (5), and steps (1) through (7) must precede step (8).

2. The method as claimed in claim 1 wherein the machining strategy is obtained by retrieving data stored in a data storage means.

3. The method as claimed in claim 1 wherein the machining strategy is obtained by application of an expert system.

4. The method as claimed in claim 1 wherein the machining strategy is obtained from data entered by a user.

5. The method as claimed in claim 1 wherein the model of the manufacturing setup is obtained by retrieving data stored in data storage means.

6. The method as claimed in claim 1 wherein the model of the manufacturing set up is obtained by application of an expert system.

7. The method as claimed in claim 1 wherein the model of the manufacturing set up is obtained from data entered by a user.

8. A method for manufacturing a part by modeling sequential tooling operations to be performed on a piece of stock to produce the part, comprising:
(1) obtaining at least one feature volume to be removed from the piece of stock to produce the part;
(2) obtaining a machining strategy;
(3) determining from the at least one feature volume and the machining strategy an initial tool path for at least one machine tool;
(4) determining an initial tool volume from the initial tool path;
(5) performing a Boolean operation to subtract the initial tool volume from the feature volume to obtain a delta volume;
(6) repeating step (3) with the delta volume to obtain a next tool path, step (4) to determine a next tool volume from the next tool path, and step (5) to obtain a next tool volume;
(7) repeating step (6) until all delta volumes have been processed; and
(8) sequentially applying the initial tool path and each next tool path to control at least one machine tool to remove the delta volume and each next delta volume from the piece of stock.

9. The method as claimed in claim 8 further comprising the steps of obtaining a solid model of at least one avoidance volume and not allowing the tool paths to intrude therein.

10. The method as claimed in claim 8 wherein the feature volume is obtained by retrieving feature data stored in a data storage means.

11. The method as claimed in claim 8 wherein the feature volume is obtained by application of an expert system.

12. The method as claimed in claim 8 wherein the machining strategy is obtained by retrieving data stored in data storage means.

13. The method as claimed in claim 8 wherein the machining strategy is obtained by application of an expert system.

14. The method as claimed in claim 8 wherein the machining strategy is obtained from data entered by a user.

15. The method as claimed in claim 8 further comprising the step of determining an optimum feedrate along the initial and each next tool path.

16. The method as claimed in claim 15 wherein the optimum feedrate is continuously variably along the initial and each next tool path.

17. The method as claimed in claim 8 wherein manufacturing attributes are obtained for the feature volume by retrieving manufacturing data stored in data storage means and wherein the manufacturing attributes comprise data used in step (3) in determining the initial tool path and in step (6) in determining the next tool path.

18. The method as claimed in claim 17 wherein the machining strategy comprises the manufacturing attributes.

19. The method as claimed in claim 17 wherein the manufacturing attributes further comprise data used in selecting the at least one machine tool.

20. The method as claimed in claim 19 further comprising the step of controlling the at least one machine tool at an optimum feedrate along the initial and each next tool path.

21. The method as claimed in claim 20 wherein the optimum feedrate is continuously variable along the initial and each next tool path.

22. The method as claimed in claim 19 wherein the tool path determined from the manufacturing attributes further comprises specification data for types of machine tool entries and exits, type of cut pattern, maximum depth of cut, and control of coolant.

23. The method as claimed in claim 8 wherein the feature volume further comprises a plurality of subdivision feature volumes and wherein steps (3) through (7) are sequentially applied to each of the subdivision feature volumes.

24. The method as claimed in claim 23 wherein the plurality of subdivision feature volumes are obtained from the feature volume by application of an expert system.

25. The method as claimed in claim 23 further comprising the step of sequentially applying step (8) for each of the plurality of subdivision feature volumes.

26. The method as claimed in claim 25 wherein the sequence in which the subdivision feature volumes are removed from the piece of stock is determined by application of an expert system.

27. The method as claimed in claim 25 wherein a plurality of the subdivision feature volumes are each contiguous to one of a plurality of desired planar faces, the faces being in parallel planes, of the part to be produced and further comprising the step of removing such subdivision feature volumes in a sequence determined by their relative spacing in a direction perpendicular to such planar faces.

28. The method as claimed in claim 8 further comprising the steps of obtaining at least one constraint volume and limiting the tool paths to the volume defined by the intersection of the at least one constraint volume and the delta volume.

29. A method for producing a part by modeling sequential tooling operations to be performed on a piece of stock to produce the part, comprising:
 (1) obtaining a solid model of the piece of stock;
 (2) obtaining a solid model of the part;
 (3) performing a first Boolean operation to subtract the part model from the stock model to obtain an initial delta volume;
 (4) obtaining a machining strategy;
 (5) using the initial delta volume and the machining strategy to compute an initial tool path for at least one machine tool;
 (6) determining an initial tool volume from the initial tool path;
 (7) performing a second Boolean operation to subtract the initial tool volume from the initial delta volume to obtain a next delta volume;
 (8) repeating step (5) with the next delta volume to obtain a next tool path, step (6) to determine a next tool volume from the next tool path, and step (7) to obtain yet a next delta volume;
 (9) repeating step (8) until all the delta volumes have been processed; and
 (10) sequentially applying the initial tool path and each next tool path to control at least one machine tool to remove the initial delta volume and each next delta volume from the piece of stock.

30. The method as claimed in claim 29 wherein the solid model of the part is obtained by retrieving data stored in data storage means.

31. The method as claimed in claim 29 wherein the solid model for the piece of stock is obtained by retrieving data stored in data storage means;.

32. The method as claimed in claim 29 wherein the machining strategy is obtained by retrieving data stored in a data storage means.

33. The method as claimed in claim 29 wherein the machining strategy is obtained by application of an expert system.

34. The method as claimed in claim 29 wherein the machining strategy is obtained from data entered by a user.

35. The method as claimed in claim 29 further comprising the step of performing additional Boolean operations to subtract the initial tool volume and each next tool volume from the stock model to obtain an initial modified stock model and next modified stock models, whereby a solid model is obtained of the remaining piece of stock after the initial and each next traverse of the machine tool along the initial and each next tool path, respectively.

36. The method as claimed in claim 29 wherein manufacturing attributes are obtained for the initial delta volume by retrieving manufacturing data stored in data storage means and wherein the manufacturing attributes comprise data used in step (5) in determining the initial tool path and in step (8) in determining the next tool path.

37. The method as claimed in claim 36 wherein the manufacturing strategy comprises the manufacturing attributes.

38. The method as claimed in claim 29 wherein the initial delta volume further comprises a plurality of subdivision delta volumes and wherein steps (5) through (9) are sequentially applied to each of the subdivision delta volumes.

39. The method as claimed in claim 38 wherein the plurality of subdivision delta volumes are obtained from the initial delta volume by application of an expert system.

40. The method as claimed in claim 39 wherein the sequence in which the steps (5) through (9) are applied to the subdivision delta volumes is determined by application of an expert system.

41. The method as claimed in claim 29 wherein manufacturing attributes are obtained for the initial delta volume by application of an expert system and wherein the manufacturing attributes comprise data used in step (5) in determining the initial tool path and in step (8) in determining the next tool path.

42. The method as claimed in claim 41 wherein the manufacturing attributes further comprise data used in selecting the at least one machine tool.

43. The method as claimed in claim 41 wherein the manufacturing strategy comprises the manufacturing attributes.

44. A method for producing a part by modeling sequential tooling operations to be performed on a piece of stock to produce the part, comprising:
 (1) obtaining a solid model of the piece of stock;
 (2) obtaining a solid model of the part;
 (3) obtaining a machining strategy;
 (4) using the machining strategy to compute an initial tool path through the model of the stock but avoiding the model of the part;
 (5) determining an initial tool volume from the initial tool path;
 (6) performing a Boolean operation to subtract the initial tool volume from the model of the stock to obtain a next model of the stock;
 (7) repeating step (4) using the next model of the stock to obtain a next tool path, step (5) to determine a next tool volume from the next tool path, and step (6) using the next tool volume to obtain yet a next model of the stock;
 (8) repeating step (7) until the next model of the stock is less than a predetermined volume; and
 (9) sequentially applying the initial tool path and each next tool path to control a machine tool.

45. The method as claimed in claim 44 wherein the solid model for the piece of stock is obtained by retrieving data stored in data storage means.

46. The method as claimed in claim 44 wherein the solid model for the part is obtained for retrieving data stored in data storage means.

47. The method as claimed in claim 44 wherein step (4) is performed by classifying the model of the part as an avoidance volume by the application of a expert system.

48. The method as claimed in claim 44 wherein step (4) further comprises the substeps of:
  (i) locating the model of the part within the model of the stock;
  (ii) obtaining initial planar cross-sections at an initial depth of the model of the piece of stock and of the model of the part located therein;
  (iii) performing a two-dimensional Boolean operation to subtract the initial cross-section of the model of the part from the initial cross-section of the model of the piece of stock to obtain an initial cross-section of the piece of stock to be removed; and
  (iv) using the initial cross-section of the piece of stock to be removed to compute an initial tool path for a machine tool.

49. The method as claimed in claim 48 further comprising the steps of
  (1) obtaining a two-dimensional avoidance profile; and
  (2) performing a two-dimensional Boolean operation to subtract the avoidance profile from the cross-section of the piece of stock to be removed before performing substep (iv).

50. A method for manufacturing a part by modeling sequential tooling operations to be performed on a piece of stock to produce the part, comprising:
  (1) obtaining a machining strategy;
  (2) obtaining a solid model of the piece of stock;
  (3) obtaining a solid model of the part;
  (4) obtaining a two-dimensional profile of an avoidance volume;
  (5) locating the model of the part within the model of the stock;
  (6) obtaining initial planar cross-sections at an initial depth of the model of the piece of stock and of the model of the part located therein;
  (7) performing a first two-dimensional Boolean operation to subtract the initial cross-section of the model of the part from the initial cross-section of the model of the stock to obtain a cross-section of the piece of stock to be removed;
  (8) performing a second two-dimensional Boolean operation to subtract the profile of the avoidance volume from the cross-section of the piece of stock to be removed
  (9) using the machining strategy and the initial cross-section of the piece of stock to be removed to compute an initial tool path for a machine tool;
  (10) determining an initial tool volume from the initial tool path at the initial depth;
  (11) not allowing the tool path to intrude into the cross-section of the model of the part or the avoidance profile;
  (12) repeating steps (7) through (11) using next planar cross-sections of the model of the part and of the model of the piece of stock obtained at a next depth;
  (13) repeating step (12) until the piece of stock to be removed is less than a predetermined volume; and
  (14) sequentially applying the initial tool path and each next tool path to control at least one machine tool to machine the part from the piece of stock.

51. The method as claimed in claim 50 wherein the machining strategy is obtained by retrieving data from a data storage means.

52. The method as claimed in claim 50 wherein the machining strategy is obtained by application of an expert system.

53. The method as claimed in claim 50 wherein the machining strategy is obtained from data entered by a user.

54. The method as claimed in claim 50 wherein the solid model of the piece of stock is obtained by retrieving data stored in data storage means.

55. The method as claimed in claim 50 wherein the solid model of the part is obtained by retrieving data stored in data storage means.

56. The method as claimed in claim 50 wherein the two dimensional profile of an avoidance volume is obtained by retrieving data stored in data storage means.

57. The method as claimed in claim 50 wherein the two dimensional profile of an avoidance volume is obtained by application of an expert system.

58. Apparatus for manufacturing a part from a piece of stock, comprising:
  (1) means for obtaining a feature volume to be removed from the piece of stock to produce the part;
  (2) means for determining from the feature volume an initial tool path for at least one machine tool;
  (3) means for determining an initial tool volume from the initial tool path;
  (4) means for performing a first Boolean operation to subtract the initial tool volume from the feature volume to obtain a delta volume;
  (5) means for determining from the delta volume a next tool path;
  (6) means for determining from the next tool path a next tool volume;
  (7) means for performing a second Boolean operation to subtract each next tool volume from the delta volume to obtain a next tool volume; and
  (8) means for sequentially applying the initial tool path and each next tool path to control the at least one machine tool to remove the delta volume and each next delta volume from the piece of stock.

59. The apparatus as claimed in claim 58 further comprising a data storage means and means for retrieving feature data stored in the data storage means.

60. The apparatus as claimed in claim 59 further comprising means for obtaining manufacturing attributes for the feature volume by retrieving manufacturing data stored in the data storage means.

61. The apparatus as claimed in claim 60 further comprising means for selecting the at least one machine tool based on the manufacturing attributes.

62. The apparatus as claimed in claim 58 further comprising sectioning means for subdividing the feature volume into a plurality of subdivision feature volumes.

63. The apparatus as claimed in claim 62 further comprising means for sequentially applying the initial tool path and each next tool path to control a machine tool to remove the delta volume and each next delta volume from the piece of stock for each of the plurality of subdivision feature volumes.

64. The apparatus as claimed in claim 58 wherein the means for determining from the feature volume an initial tool path for at least one machine tool comprises means for obtaining and using a manufacturing strategy.

* * * * *